US008228938B2

(12) United States Patent
Ji (10) Patent No.: US 8,228,938 B2
(45) Date of Patent: Jul. 24, 2012

(54) METHOD AND APPARATUS FOR PREVENTING A MISS-DETECTION OF DUPLICATED PACKETS AND AN OUT-OF-SEQUENCE DELIVERY TO THE HIGHER LAYER IN UNACKNOWLEDGED MODE OPERATION

(75) Inventor: Baowei Ji, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 301 days.

(21) Appl. No.: 12/633,598

(22) Filed: Dec. 8, 2009

(65) Prior Publication Data
US 2010/0195519 A1     Aug. 5, 2010

Related U.S. Application Data

(60) Provisional application No. 61/206,631, filed on Feb. 2, 2009, provisional application No. 61/276,746, filed on Sep. 16, 2009.

(51) Int. Cl.
*H04L 12/43* (2006.01)
(52) U.S. Cl. ........................................................ 370/458
(58) Field of Classification Search .................. 370/252, 370/253, 254, 310, 321, 337, 347, 431, 458, 370/459
See application file for complete search history.

(56) References Cited

U.S. PATENT DOCUMENTS

| 7,573,883 | B2 * | 8/2009 | Padmanaban et al. | 370/394 |
|---|---|---|---|---|
| 2002/0126675 | A1 * | 9/2002 | Yoshimura et al. | 370/395.21 |
| 2003/0007480 | A1 | 1/2003 | Kim et al. | |
| 2003/0128705 | A1 | 7/2003 | Yi et al. | |
| 2005/0147040 | A1 | 7/2005 | Vayanos et al. | |
| 2005/0226198 | A1 * | 10/2005 | Barak et al. | 370/345 |
| 2006/0245410 | A1 * | 11/2006 | Jiang | 370/346 |
| 2007/0253401 | A1 * | 11/2007 | Jiang | 370/350 |
| 2008/0225893 | A1 * | 9/2008 | Cave et al. | 370/476 |
| 2009/0083603 | A1 * | 3/2009 | Chao et al. | 714/748 |
| 2009/0135718 | A1 * | 5/2009 | Yeo et al. | 370/225 |
| 2009/0190480 | A1 * | 7/2009 | Sammour et al. | 370/242 |
| 2009/0221242 | A1 | 9/2009 | Bergstrom et al. | |
| 2011/0058497 | A1 * | 3/2011 | Lindskog et al. | 370/252 |

FOREIGN PATENT DOCUMENTS

| KR | 1020020095125 A | 12/2002 |
|---|---|---|
| KR | 1020030060028 A | 7/2003 |
| KR | 1020050119683 A | 12/2005 |
| KR | 1020060120605 A | 11/2006 |

OTHER PUBLICATIONS

International Search Report dated Sep. 16, 2010 in connection with International Patent Application No. PCT/KR2010/000497.

* cited by examiner

*Primary Examiner* — Gary Mui (57) ABSTRACT

A terminal is configured to perform a method capable of preventing the miss detection of duplicated unacknowledged mode data (UMD) protocol data units (PDU) and out-of-sequence delivery in unacknowledged mode (UM) operations. The terminal includes a receiver configured to not make a slot with a sequence number (SN) of k available to receive in new UMD PDU unless a time has passed such that no more retransmissions of a previous UMD PDU with the SN of k is possible. The terminal also includes a transmitter configured to determine a transmission window size for transmitting UMD PDUs.

23 Claims, 7 Drawing Sheets

METHOD AND APPARATUS FOR PREVENTING A MISS-DETECTION OF DUPLICATED PACKETS AND AN OUT-OF-SEQUENCE DELIVERY TO THE HIGHER LAYER IN UNACKNOWLEDGED MODE OPERATION

CROSS-REFERENCE TO RELATED APPLICATIONS AND CLAIM OF PRIORITY

The present application is related to U.S. Provisional Patent No. 61/206,631, filed Feb. 2, 2009, entitled "METHOD FOR PREVENTING THE MISS-DETECTION OF DUPLICATED PACKETS AND THE OUT-OF-SEQUENCE DELIVERY TO THE HIGHER LAYER IN UNACKNOWLEDGED MODE OPERATION" and U.S. Provisional Patent No. 61/276,746, filed Sep. 16, 2009, entitled "APPARATUS AND METHOD FOR RIGOROUS UNACKNOWLEDGED MODE AND NON-ARQ PROTOCOL". Provisional Patent Nos. 61/206,631 and 61/276,746 are assigned to the assignee of the present application and is hereby incorporated by reference into the present application as if fully set forth herein. The present application hereby claims priority under 35 U.S.C. §119(e) to U.S. Provisional Patent Nos. 61/206,631 and 61/276,746.

TECHNICAL FIELD OF THE INVENTION

The present application relates generally to communication systems and, more specifically, to a method and apparatus for preventing miss detection of duplicated packets and an out-of-sequence delivery to the higher layer in an unacknowledged mode in a hybrid automatic repeat request system.

BACKGROUND OF THE INVENTION

The 3rd Generation Partnership Project Evolved Universal Terrestrial Radio Access Network (3GPP E-UTRAN) (a.k.a., Long Term Evolution or LTE) specifies a method for an automatic repeat request (ARQ) receiver to send feedback to an ARQ transmitter in which the sequence numbers of missing packets are explicitly listed one by one. IEEE 802.16e and its associated WiMAX system use another ARQ feedback method that includes a number of message formats for indicating the missing parts. In a Hybrid ARQ (HARQ), a number of forward error correction (FEC) bits are added to the existing Error Detection (ED) bits.

SUMMARY OF THE INVENTION

A terminal capable of preventing the miss detection of duplicated unacknowledged mode data (UMD) protocol data units (PDU) and out-of-sequence delivery in unacknowledged mode (UM) operations is provided. The terminal includes a receiver configured to not make a slot with a sequence number (SN) of k available to receive a new UMD PDU unless a time has passed such that no more retransmissions of a previous UMD PDU with the SN of k is possible.

A method for preventing the miss detection of duplicated unacknowledged mode data (UMD) protocol data units (PDU) and out-of-sequence delivery in unacknowledged mode (UM) operations is provided. The method includes making a slot with a sequence number (SN) of k available to receive a new UMD PDU after a time has passed such that no more retransmission of the previous UMD PDU with an SN of k is possible.

A system capable of preventing the miss detection of duplicated unacknowledged mode data (UMD) protocol data units (PDU) and out-of-sequence delivery in unacknowledged mode (UM) operations is provided. The system includes a receiver configured to not make a slot with a sequence number (SN) of k available to receive a new UMD PDU unless a time has passed such that no more retransmissions of a previous UMD PDU with the SN of k is possible. The system also includes a transmitter configured to determine a transmission window size for transmitting UMD PDUs.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1 through 9, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged wireless communications system.

With regard to the following description, it is noted that the LTE term "node B" is another term for "base station" used below. Also, the LTE term "user equipment" or "UE" is another term for "subscriber station" used below.

As described in IEEE 802.16m System Requirements, a Femtocell is a low power Base Station (BS). Femtocells are typically installed by a subscriber in a home or small office/home office to provide access to closed or open group of users as configured by the subscriber and/or the access provider. Femtocell BS's typically operate in licensed spectrum and may use the same or different frequency as macro-cells and use broadband connection such as cable or DSL for backhaul. The mobile station (MS)'s using access in a femtocell are typically stationary or moving at low (i.e., pedestrian) speed.

The advancement of high-speed wireless communication technologies, such as LTE and Mobile WiMAX (IEEE 802.16e) has challenged the ARQ and non-ARQ schemes as the widely used flow and error control mechanisms in a TCP/IP network. Specifically, the interaction of HARQ in layer-1 and non-ARQ in layer-2 could produce out-of-sequence or duplicated packets in numerous scenarios, such as ACK-to-NACK or NACK-to-ACK errors.

In some embodiments, a sliding window control is incorporated for ARQ operation, such as Go-Bank-N, Stop-and-Wait, Selective retransmission, and the like. Non-ARQ, however, operates differently since there is no layer-2 feedback. To combine non-ARQ with HARQ can create even more challenge, because HARQ-level retransmission and multiple HARQ processes could results in out-of-sequence arrivals of layer-2 protocol data units (PDUs).

Figure 1:
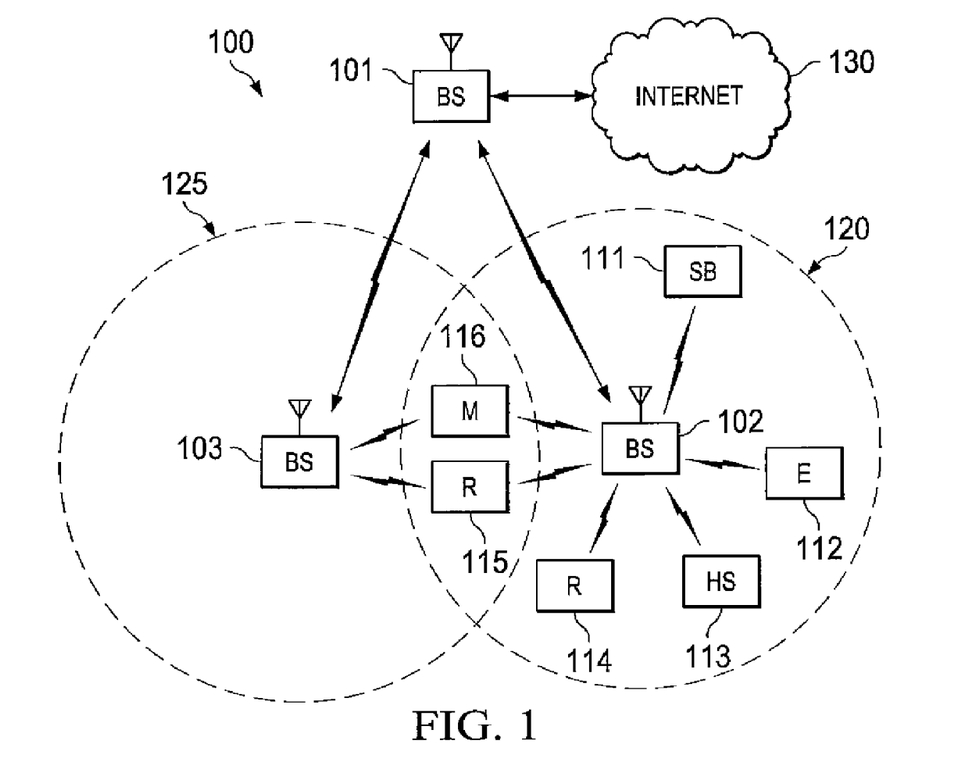
FIG. 1 illustrates an exemplary wireless network according to the principles of the present disclosure.

FIG. 1 illustrates exemplary wireless network 100, which transmits messages according to the principles of the present disclosure. In the illustrated embodiment, wireless network 100 includes base station (BS) 101, base station (BS) 102, base station (BS) 103, and other similar base stations (not shown). In some embodiments, one or more femto base stations (FBS) (not shown) are included in the wireless network 100.

Base station 101 is in communication with Internet 130 or a similar IP-based network (not shown).

Base station 102 provides wireless broadband access to Internet 130 to a first plurality of subscriber stations within coverage area 120 of base station 102. The first plurality of subscriber stations includes subscriber station 111, which may be located in a small business (SB), subscriber station 112, which may be located in an enterprise (E), subscriber station 113, which may be located in a WiFi hotspot (HS), subscriber station 114, which may be located in a first residence (R), subscriber station 115, which may be located in a second residence (R), and subscriber station 116, which may be a mobile device (M), such as a cell phone, a wireless laptop, a wireless PDA, or the like.

Base station 103 provides wireless broadband access to Internet 130 to a second plurality of subscriber stations within coverage area 125 of base station 103. The second plurality of subscriber stations includes subscriber station 115 and subscriber station 116. In an exemplary embodiment, base stations 101-103 may communicate with each other and with subscriber stations 111-116 using OFDM or OFDMA techniques.

While only six subscriber stations are depicted in FIG. 1, it is understood that wireless network 100 may provide wireless broadband access to additional subscriber stations. It is noted that subscriber station 115 and subscriber station 116 are located on the edges of both coverage area 120 and coverage area 125. Subscriber station 115 and subscriber station 116 each communicate with both base station 102 and base station 103 and may be said to be operating in handoff mode, as known to those of skill in the art.

Subscriber stations 111-116 may access voice, data, video, video conferencing, and/or other broadband services via Internet 130. In an exemplary embodiment, one or more of subscriber stations 111-116 may be associated with an access point (AP) of a WiFi WLAN. Subscriber station 116 may be any of a number of mobile devices, including a wireless-enabled laptop computer, personal data assistant, notebook, handheld device, or other wireless-enabled device. Subscriber stations 114 and 115 may be, for example, a wireless-enabled personal computer (PC), a laptop computer, a gateway, or another device.

Figure 2:
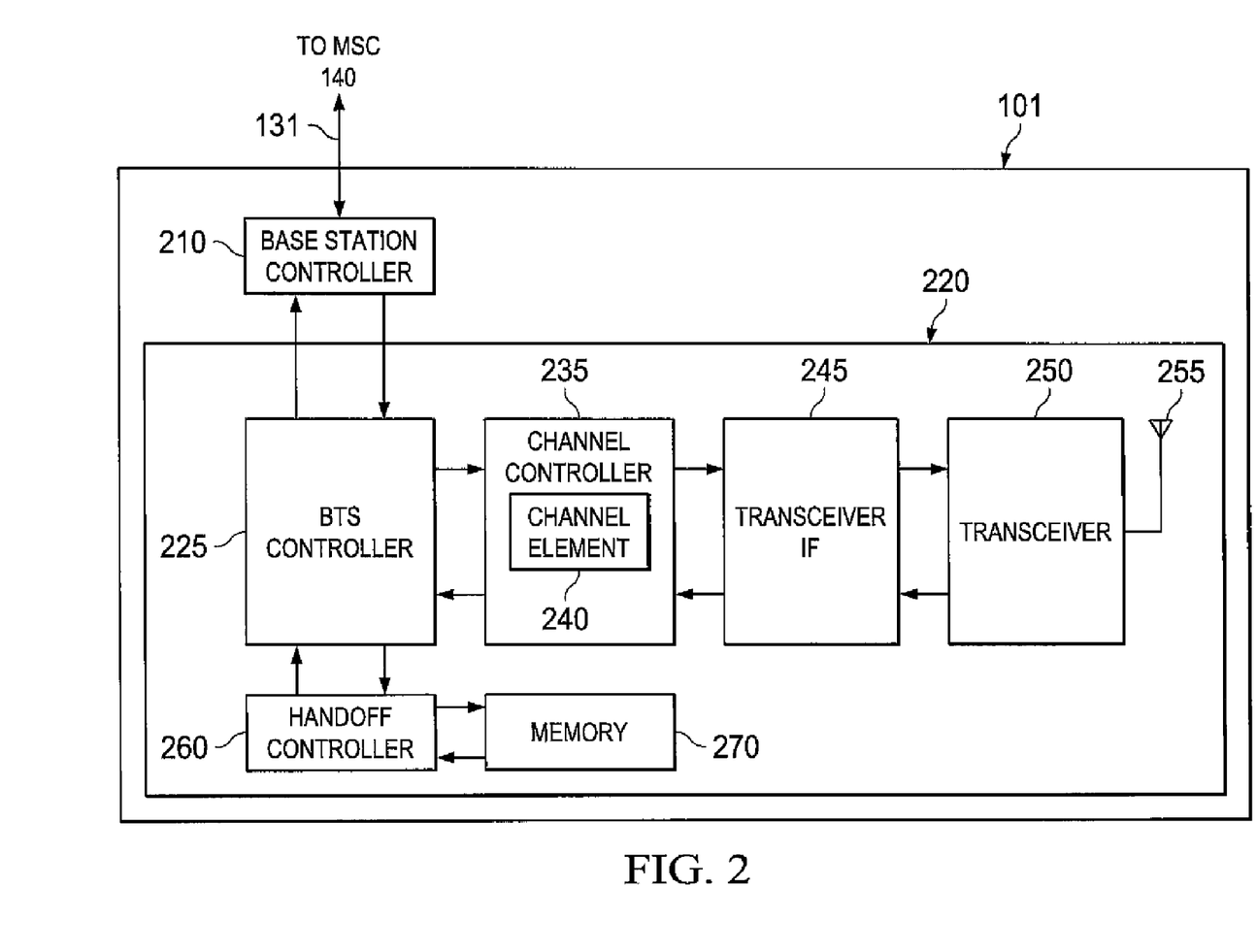
FIG. 2 illustrates exemplary base station 101 in greater detail according to embodiments of the present disclosure.

FIG. 2 illustrates exemplary base station 102 in greater detail according embodiments of the present disclosure. The embodiment of base station 102 illustrated in FIG. 2 is for illustration only. Other embodiments of the base station 102 could be used without departing from the scope of this disclosure. It will be understood that although BS 102 is described for illustration and example only, descriptions can apply to BS 101 and BS 103 equally.

Base station 102 includes base station controller (BSC) 210 and base transceiver subsystem (BTS) 220. Base station controllers and base transceiver subsystems were described previously in connection with FIG. 1. BSC 210 manages the resources in cell site 120, including BTS 220. BTS 220 comprises BTS controller 225, channel controller 235, transceiver interface (IF) 245, RF transceiver unit 250, and antenna array 255. Channel controller 235 comprises a plurality of channel elements, including exemplary channel element 240. BTS 220 also comprises a handoff controller 260. The embodiment of handoff controller 260 and memory 270 included within BTS 220 is for illustration only. Handoff controller 260 and memory 270 can be located in other portions of BS 102 without departing from the scope of this disclosure.

BTS controller 225 includes processing circuitry and memory capable of executing an operating program that communicates with BSC 210 and controls the overall operation of BTS 220. For example, BTS controller 225 can execute the plurality of instructions in memory to perform operations to prevent miss-detection of duplicated packets and the out-of-sequence delivery to the higher layer in unacknowledged mode operation. Under normal conditions, BTS controller 225 directs the operation of channel controller 235, which contains a number of channel elements, including channel element 240, that perform bi-directional communications in the forward channels and the reverse channels. A forward channel refers to a channel in which signals are transmitted from the base station to the mobile station. A reverse channel refers to a channel in which signals are transmitted from the mobile station to the base station. In some embodiments, the channel elements communicate according to a code division multiple access (CDMA) protocol with the mobile stations in cell 120. In additional and alternative embodiments, the channel elements communicate according to an OFDMA protocol with the mobile stations in cell 120. Transceiver IF 245 transfers the bi-directional channel signals between channel controller 240 and RF transceiver unit 250.

Antenna array 255 transmits forward channel signals received from RF transceiver unit 250 to mobile stations in the coverage area of BS 102. Antenna array 255 also sends to transceiver 250 reverse channel signals received from mobile stations in the coverage area of BS 102. In some embodiments, antenna array 255 is a multi-sector antenna, such as a three-sector antenna in which each antenna sector is responsible for transmitting and receiving in a 120° arc of coverage area. Additionally, RF transceiver 250 may contain an antenna selection unit to select among different antennas in antenna array 255 during transmit and receive operations.

Memory 270 can be any computer readable medium, for example, the memory 270 can be any electronic, magnetic, electromagnetic, optical, electro-optical, electro-mechanical, and/or other physical device that can contain, store, communicate, propagate, or transmit a computer program, software, firmware, or data for use by the microprocessor or other computer-related system or method. Memory 270 comprises a random access memory (RAM) and another part of memory 270 comprises a Flash memory, which acts as a read-only memory (ROM).

Figure 3:
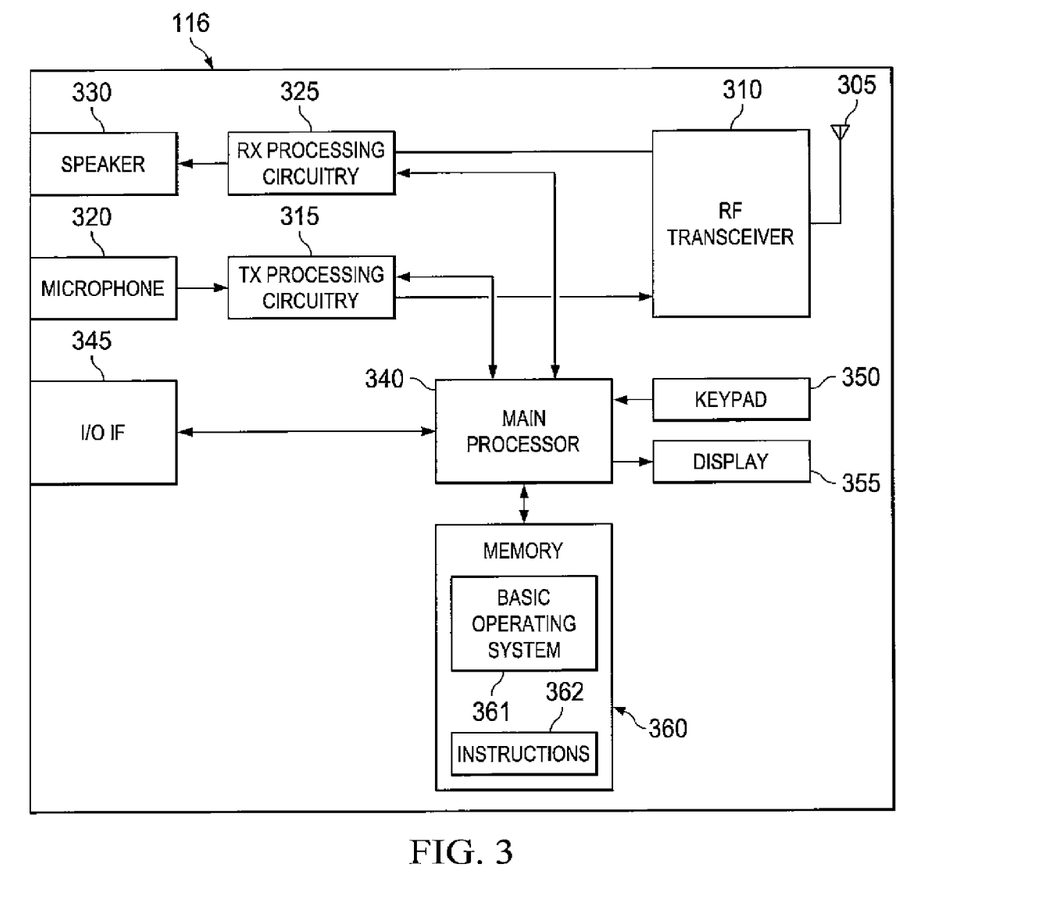
FIG. 3 illustrates wireless mobile station 111 according to embodiments of the present disclosure.

FIG. 3 illustrates wireless mobile station 111 according to embodiments of the present disclosure. The embodiment of wireless mobile station 116 illustrated in FIG. 3 is for illustration only. Other embodiments of the wireless mobile station 116 could be used without departing from the scope of this disclosure. It will be understood that although MS 116 is described for illustration and example only, descriptions can apply to MS 111-115 equally.

Wireless mobile station 116 includes antenna 305, radio frequency (RF) transceiver 310, transmit (TX) processing circuitry 315, microphone 320, and receive (RX) processing circuitry 325. MS 116 also includes speaker 330, main processor 340, input/output (I/O) interface (IF) 345, keypad 350, display 355, and memory 360. Memory 360 further includes basic operating system (OS) program 361 and a plurality of instructions 362.

Radio frequency (RF) transceiver 310 receives from antenna 305 an incoming RF signal transmitted by a base station (such as, either a base station or femto base station) of wireless network 100. Radio frequency (RF) transceiver 310 down-converts the incoming RF signal to produce an intermediate frequency (IF) or a baseband signal. The IF or baseband signal is sent to receiver (RX) processing circuitry 325 that produces a processed baseband signal by filtering, decoding, and/or digitizing the baseband or IF signal. Receiver (RX) processing circuitry 325 transmits the processed baseband signal to speaker 330 (i.e., voice data) or to main processor 340 for further processing (e.g., web browsing).

Transmitter (TX) processing circuitry 315 receives analog or digital voice data from microphone 320 or other outgoing baseband data (e.g., web data, e-mail, interactive video game data) from main processor 340. Transmitter (TX) processing circuitry 315 encodes, multiplexes, and/or digitizes the outgoing baseband data to produce a processed baseband or IF signal. Radio frequency (RE) transceiver 310 receives the outgoing processed baseband or IF signal from transmitter (TX) processing circuitry 315. Radio frequency (RF) transceiver 310 up-converts the baseband or IF signal to a radio frequency (RF) signal that is transmitted via antenna 305.

In some embodiments of the present disclosure, main processor 340 is a microprocessor or microcontroller. Memory 360 is coupled to main processor 340. According to some embodiments, part of memory 360 comprises a random access memory (RAM) and another part of memory 360 comprises a Flash memory, which acts as a read-only memory (ROM).

Main processor 340 executes basic operating system (OS) program 361 and/or the plurality of instructions 362 stored in memory 360 in order to control the overall operation of wireless mobile station 116. For example, main processor 340 can execute the plurality of instructions 362 to perform operations to prevent miss-detection of duplicated packets and the out-of-sequence delivery to the higher layer in unacknowledged mode operation. In one such operation, main processor 340 controls the reception of forward channel signals and the transmission of reverse channel signals by radio frequency (RF) transceiver 310, receiver (RX) processing circuitry 325, and transmitter (TX) processing circuitry 315, in accordance with well-known principles.

Main processor 340 is capable of executing other processes and programs resident in memory 360. Main processor 340 can move data into or out of memory 360, as required by an executing process. Main processor 340 is also coupled to I/O interface 345. I/O interface 345 provides mobile station 116 with the ability to connect to other devices such as laptop computers and handheld computers. I/O interface 345 is the communication path between these accessories and main controller 340.

Main processor 340 is also coupled to keypad 350 and display unit 355. The operator of mobile station 116 uses keypad 350 to enter data into mobile station 116. Display 355 may be a liquid crystal display capable of rendering text and/or at least limited graphics from web sites. Alternate embodiments may use other types of displays.

In LTE, the unacknowledged mode (UM) is case wherein no retransmission exists in the radio link control (RLC) layer even though HARQ retransmission still applies in order to achieve relatively robust data transmission over lossy wireless channels. This is a typical non-ARQ protocol, but unfortunately, with serious design flaws because of the lack of flow control in the UM transmitter side, the careless handling of packet loss in the UM receiver side and the undue limitation of the UM window size.

Figure 4:
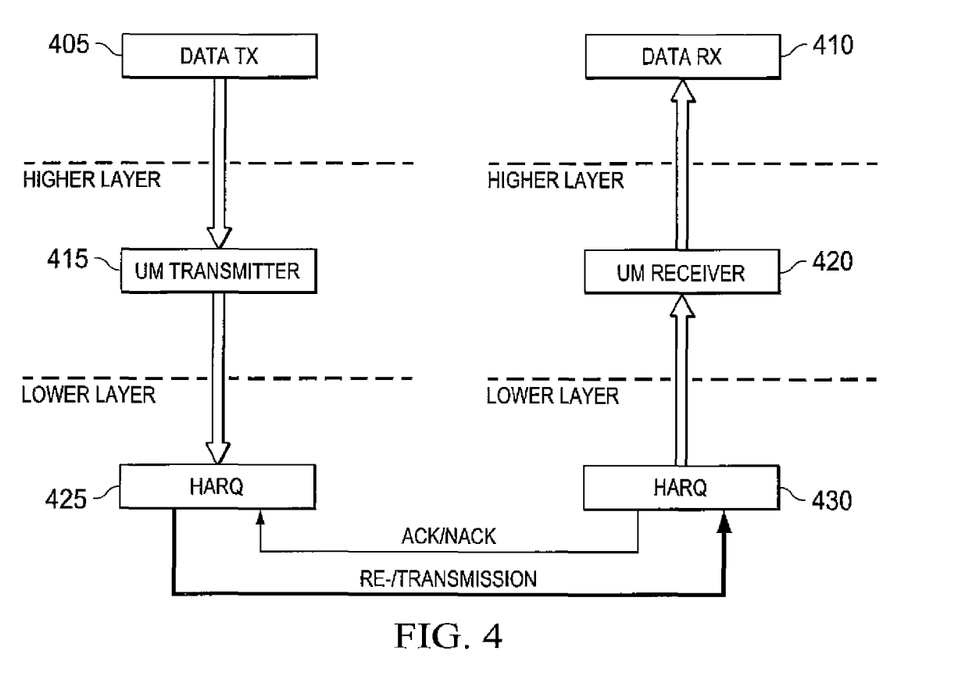
FIG. 4 illustrates a model of UM and HARQ entities according to embodiments of the disclosure.

FIG. 4 illustrates a model of UM and HARQ entities according to embodiments of the disclosure. A data transmitter 405 and data Receiver 410 are each included in a layer above the UM transmitter 415 and UM receiver 420. A HARQ transmitter 425 and HARQ receiver 425 are included in the lower layer below the UM transmitter 415 and UM receiver 420.

The UM transmitter 415 maintains one state variable, that is VT(US). The state variable, VT(US), holds a value sequence number (SN) to be assigned for the next generated unacknowledged mode data (UMD) protocol data unit (PDU). VT(US) is initially set to zero. When delivering a new UMD PDU to the lower layer, such as to HARQ transmitter 325, the UM transmitter 415 RLC sets the SN of the UMD PDU to the current VT(US), then increments VT(US) by one.

The UM receiver 420 maintains the following three state variables: VR(UR), VR(UH), and VR(UX). VR(UR) is a state variable that holds the value of the SN of the earliest UMD PDU that is still considered for HARQ reordering. VR(UR) corresponds to the rear edge of the UM receiving window, initially set to zero. VR(UH) is a state variable that holds the value of SN following the highest SN among received UMD PDUs. VR(UH) corresponds to the higher edge of the UM receiving window, initially set to zero. VR(UX) is a state variable that holds the value of SN following the SN of the UMD PDU which triggered the timer t_reordering.

The timer t_reordering is used by the UM receiver 420 RLC in order to detect the loss of RLC PDUs at HARQ entities 425, 430 in the lower layer. The value of T_reordering cannot be arbitrarily small. Its value considers the maximum number of HARQ retransmissions (typically, four times), the scheduling delay, especially for the downlink (DL) in many advanced wireless systems, such as E-UTRA (a.k.a., LTE), LTE-Advanced, and IEEE 802.16m, where the re-transmission could be asynchronous, namely the transmitter decides the time for each retransmission which may not have pre-defined periodicity.

The UM_Window_Size parameter is used for both the UM transmitting window and the UM receiving window. This constant is used by the UM receiver 420 RLC to define SNs of those UMD PDUs that can be received without causing an advancement of the receiving window. For example, UM_Window_Size=16 when a five bit SN is configured and UM_Window_Size=512 when a ten bit SN is configured. That is, UM_Window_Size is half of the maximum SN for each case.

For example, in transmit operations, when delivering a new UMD PDU to lower layer, the UM transmitter 415 RLC sets the SN of the UMD PDU to VT(US). The UM transmitter 415 RLC then increments VT(US) by one. However, the UM transmitter 415 delivers the new UMD PDU to the lower layer without any condition, that is, without any flow control.

In the receive operations, the UM receiver 420 RLC maintains a reordering window according to state variable VR(UH) as follows: if (VR(UH)−UM_Window_Size) <=SN<VR(UH), then an SN falls within the reordering window; otherwise an SN falls outside of the reordering window. When receiving an UMD PDU from lower layer, the UM receiver 420 RLC either discards the received UMD PDU or places the received UMD PDU in the reception buffer. If the received UMD PDU was placed in the reception buffer, the UM receiver 420 RLC update state variables, reassembles and delivers RLC service data units (SDUs) to the upper layer and starts or stops T_reordering as needed. When T_reordering expires, the UM receiver 420 RLC updates state variables, reassembles and delivers RLC SDUs to the upper layer and starts T_reordering as needed.

When an UMD PDU is received from lower layer, such as with SN=x, is received from lower layer, the UM receiver 420 RLC discards the received UMD PDU if VR(UR)<x<VR(UH) and the UMD PDU with SN=x has been received before or if (VR(UH)−UM_Window_Size)≦x<VR(UR). Alternatively, the UM receiver 420 places the received UMD PDU in the reception buffer.

When an UMD PDU with SN=x is placed in the reception buffer, the UM receiver 420 RLC update VR(UH) to x+1 if x falls outside of the reordering window. The UM receiver 420, however, accepts an SN that is larger than VR(UH) without any condition. The UM receiver 420 also reassembles RLC SDUs from any UMD PDUs with an SN that falls outside of the reordering window and removes RLC headers when doing so. Additionally, the UM receiver 420 RLC delivers the reassembled RLC SDUs to the upper layer in ascending order of the RLC SN if not delivered before. Further, the UM receiver 420 RLC sets VR(UR) to (VR(UH)−UM_Window_Size) if VR(UR) falls outside of the reordering window.

If the reception buffer contains an UMD PDU with SN=VR(UR), the UM receiver 420 RLC updates VR(UR) to the SN of the first UMD PDU with SN>current VR(UR) that has not been received; and reassembles RLC SDUs from any UMD PDUs with SN<updated VR(UR) and removes RLC headers when doing so. The UM receiver 420 RLC also delivers the reassembled RLC SDUs to the upper layer in ascending order of the RLC SN if not delivered before.

If T_reordering is running, and if VR(UX)≦VR(UR) or if VR(UX) falls outside of the reordering window and VR(UX) is not equal to VR(UH), the UM receiver 420 RLC stops and resets T_reordering. However, in conventional systems a UMD PDU could still be undergoing HARQ re-transmission even if it is outside of the reordering window. This could incur numerous problems in operation. In conventional systems, the T_reordering timer simply is turned off, which can result in an inability to differentiate a duplicated UMD PDU from a new UMD PDU. The UM receiver 420 RLC also sets VR(UX) to NULL.

If T_reordering is not running (including when T_reordering is stopped due to actions above), the UM receiver 420 RLC starts T_reordering if VR(UH)>VR(UR). The UM receiver 420 RLC also sets VR(UX) to VR(UH) if VR(UH)>VR(UR).

When T_reordering expires, the UM receiver 420 RLC updates VR(UR) to the SN of the first UMD PDU with SN≧VR(UX) that has not been received. The UM receiver 420 RLC reassembles RLC SDUs from any UMD PDUs with SN<updated VR(UR), removes RLC headers when doing so, and delivers the reassembled RLC SDUs to upper layer in ascending order of the RLC SN if not delivered before. If VR(UH)>VR(UR), the UM receiver 420 RLC starts T_reordering and sets VR(UX) to VR(UH). Alternatively, if VR(UH)≦VR(UR), the UM receiver 420 RLC sets VR(UX) to NULL.

Figure 5:
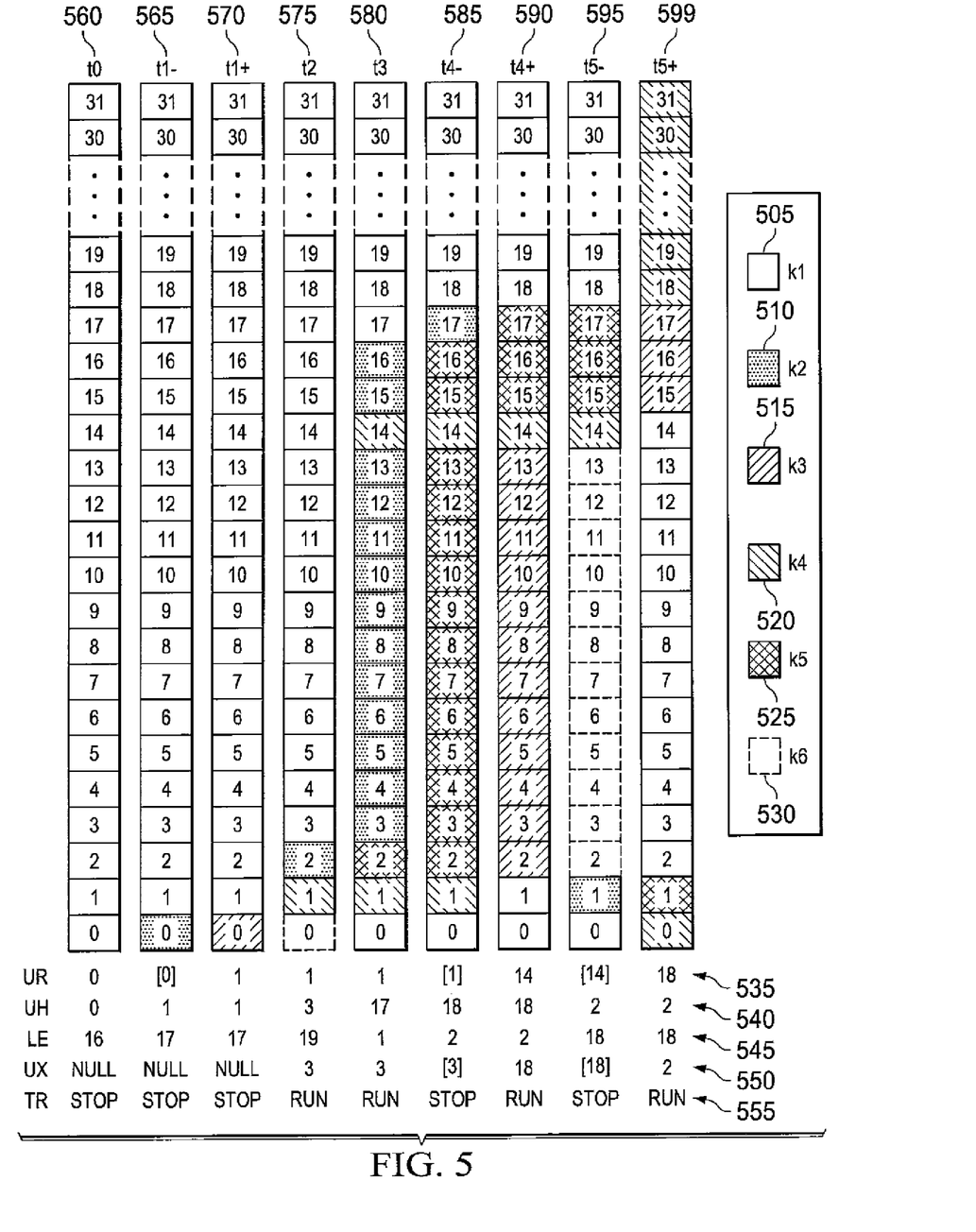
FIG. 5 illustrates an out-of-sequence delivery according to the principles of the present disclosure.

FIG. 5 illustrates an out-of-sequence delivery according to the principles of the present disclosure. In the example shown in FIG. 5 for an out-of-sequence delivery of RLC SDU to the higher layer, SN#k1 505 represents that the SN is legitimate as a new UMD PDU; SN#k2 510 represents an arriving UMD PDU; SN#k3 515 represents that a UMD PDU has been delivered to the higher layer; SN#k4 520 represents a UMD PDU that is currently missing; SN#k5 525 represents a UMD PDU that had been received and is still in the receiving window; and SN#k6 530 represents a UMD PDU that should be discarded if arriving.

Although the example illustrated in FIG. 5 uses a five bit SN, other SNs, such as a ten-bit SN or other sized SN, could be used without departing from the scope of this disclosure. Therefore, using a five-bit SN, thirty-two possible SNs (0, 1, . . . , 31) exist, as marked in each column at each time instance. The bottom of FIG. 5 illustrates the value for the state variables, VR(UR) 535, VR(UH) 540 and VR(UX) 550, of each receiving window. Additionally, the lower edge (LE) 545 and T_reordering (TR) 555 are illustrated for each receiving window. Operation commences at time instance t0 560 when all the state variables begin with the initial values.

At t1− 565, a UMD PDU with SN of '0' arrives (that is, SN#k2 510) at the UM receiver 420, which immediately sets VR(UH) 540 to '1' (i.e., VR(UH)=1). Then at t1+ 570, the UM receiver 420 delivers (that is, SN#k3 515) the UMD SDU to the higher layer, and sets VR(UR) 535 to '1' (i.e., VR(UR)=1). The receiving window includes legitimate SN 0, 31, 30, . . . , 18, 17, because the receiving window consists of sixteen (16) possible slots as specified by UM_Window_Size.

At t2 575, a UMD PDU with SN of '2' arrives (that is, SN#k2 510), which drives VR(UH) 540 to '3' (i.e., VR(UH)=3). It also indicates that a UMD PDU with SN of '1' is missing (that is, SN#k4 520), hence, VR(UX) 550 is '3' (i.e., VR(UX)=3) and the timer t_reordering 555 starts running.

From t2 575 to t3 580, UMD PDUs with SN of '3' to '16' arrive (that is, SN#k2 510) except the one with SN of '14' (that is, SN#k4 520). Therefore, VR(UH) 540 is '17' (i.e., VR(UH)=17), which means the receiving window is fully occupied at this time instance.

At t4− 585, a UMD PDU with SN of '17' arrives (that is, SN#k2 510), which will move VR(UH) 540 to '18,' and the lower edge 545 to '2'. Then, at t4+ 590, the receiving window includes slots of '17,' '16,' '2.' The previous VR(UR) 535 is out of the receiving window at this time. Therefore, VR(UR) 535 is updated as '14,' and all the UMD SDUs from '2' to '13' are delivered (that is, SN#k3 515) to the higher layer.

Even though everything appears to working as expected, at t4− 585, however, the UM receiver 420 blindly stopped the t_reordering 555 timer because VR(UX) 550, previously pointed at SN of '3,' would be outside of the receiving window (i.e., the new VR(UR)=14). Further, the SN of '1' now becomes legitimate for a new UMD PDU even though the retransmission of the previous UMD PDU with SN of '1' may be still occurring.

Additionally, at t5− 595, a UMD PDU with SN of '1' finally arrives (that is, SN#k2 510) after several rounds of HARQ retransmissions. The UM receiver 420 cannot differentiate this UMD PDU from a legitimate new UMD PDU. Therefore, at t5+ 599, the UM receiver 420 receives the UMD PDU as a new UMD PDU, and moves VR(UH) 540 to '2' (i.e., VR(UH)=2).

Figure 6:
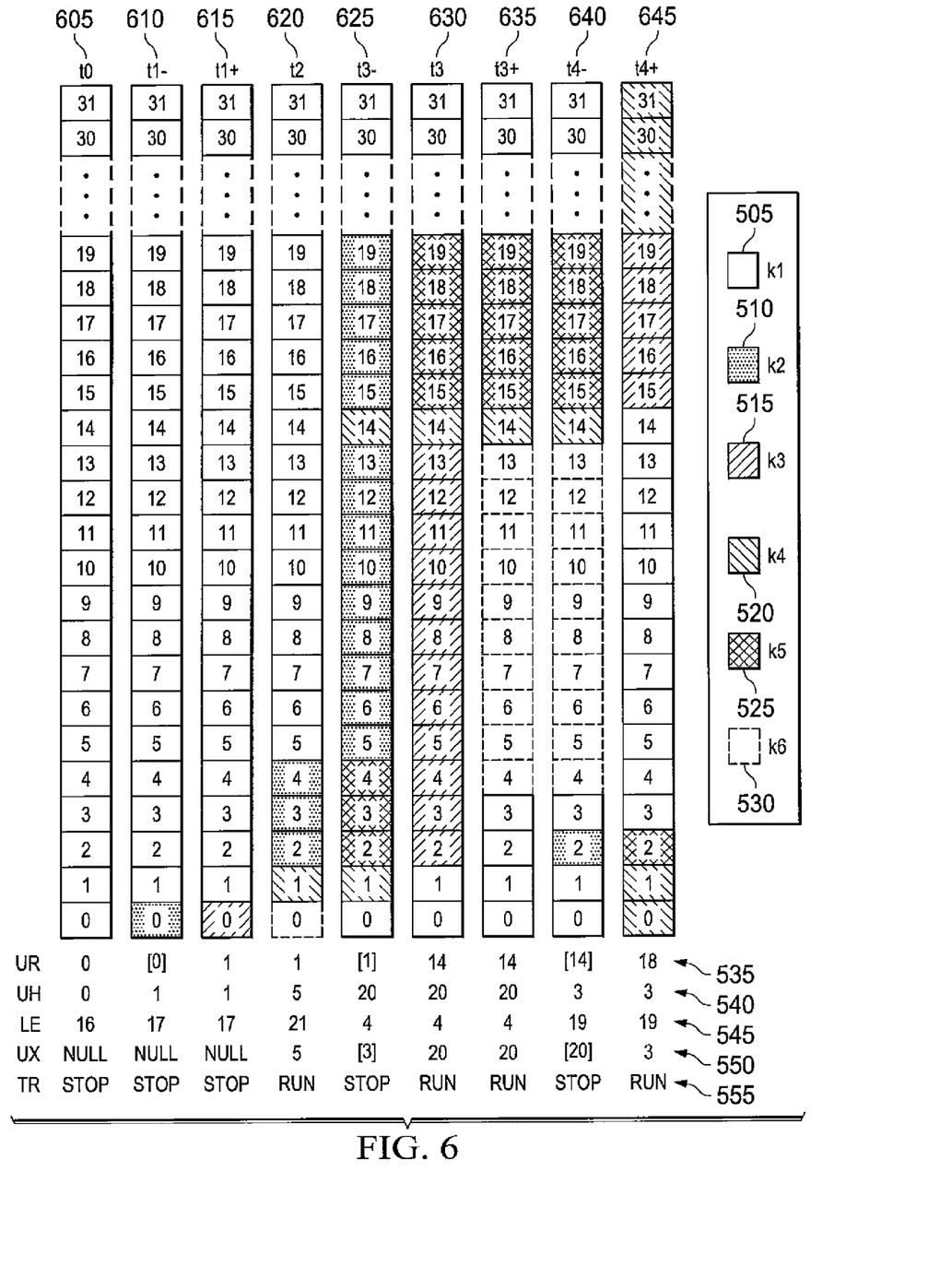
FIG. 6 illustrates another example of out-of-sequence delivery according to principles of the present disclosure.

Accordingly, from here on, numerous errors can occur. For example, if UMD PDUs with SN of '18,' '19,' '31' and '0' arrive one by one, the UMD PDU's will be delivered to the higher layer together with the one with SN of '1,' but out of the correct sequence. Another example occurs when the timer t_reordering 555 expires such that the UMD PDU with SN of '1' is delivered out of sequence and the legitimate UMD PDUs with SN from '18,' '19,' '31,' to '0' are discarded FIG. 6 illustrates another example of out-of-sequence delivery according to principles of the present disclosure. In the example shown in FIG. 6, the delivery of a duplicated RLC SDU to the higher layer can result. The notations utilized in FIG. 6 are the same as those utilized in FIG. 5. The operations from t0 605 to t1− 610 and t1+ 615 are the same as or similar to the operations from t0 560 to t1− 565 and t1+ 570 illustrated in FIG. 5.

At t2 620, UMD PDUs with SNs of '2,' '3' and '4' arrive (that is, SN#k2 510), which drives VR(UH) 540 to '5' (i.e., VR(UH)=5). It also indicates that a UMD PDU with SN of '1' is missing (that is, SN#k4 520), hence, VR(UX) 550 is 5 VR(UX)=5 and the timer T_reordering 555 starts running.

From t2 620 to t3− 625, UMD PDUs with SNs of '5' to '19' arrive (that is, SN#k2 510) except the one with SN of '14' (that is, SN#k4 520). Therefore, VR(UH) 540 equals '20' (i.e., VR(UH)=20). This moves the lower edge 545 of the receiving window to '4.' Therefore, VR(UR) 535 is updated to '14,' and all the UMD PDUs with an SN smaller than this newly updated VR(UR) 535, if available, are assembled and delivered (that is, SN#k3 515) to the higher layer (see the column of t3 630). At this time, the slots with SNs smaller than '4' are outside of the receiving window, and become legitimate for new UMD PDUs (see the column of t3+ 635).

However, this does not consider the case of ACK-to-NACK error in the HARQ layer. This mistake can break-down the protocol in many scenarios. For example, at t4− 640, a UMD PDU with an SN of '2' might be re-transmitted due to the ACK-to-NACK error. The UM receiver 420 cannot differentiate this UMD PDU from a legitimate new UMD PDU. Therefore, at t4+ 645, the UM receiver 420 receives the UMD PDU as a new UMD PDU, and moves VR(UH) 540 to '3' (i.e., VR(UH)=3 and VR(UH)=3).

From this point on, numerous errors can occur. For example, if UMD PDUs with SNs of '20,' '21,' . . . , '0' and '1' arrive one by one, then UMD PDUs will be delivered to the higher layer together with the UMD PDU with an SN of '2.' However, the UMD PDU with an SN of '2' is duplicated and the delivery is out of sequence. Another example is when the Timer T_reordering 555 expires such that the UMD PDU with an SN of '1' is delivered out of sequence and all the legitimate UMD PDUs with SNs from '20,' '21,' . . . , '31,' to '1' are discarded.

Embodiments of the present disclosure provide for a terminal configured to prevent the miss detection of duplicated UMD PDU and out-of-sequence delivery in UM operation.

Figure 7:
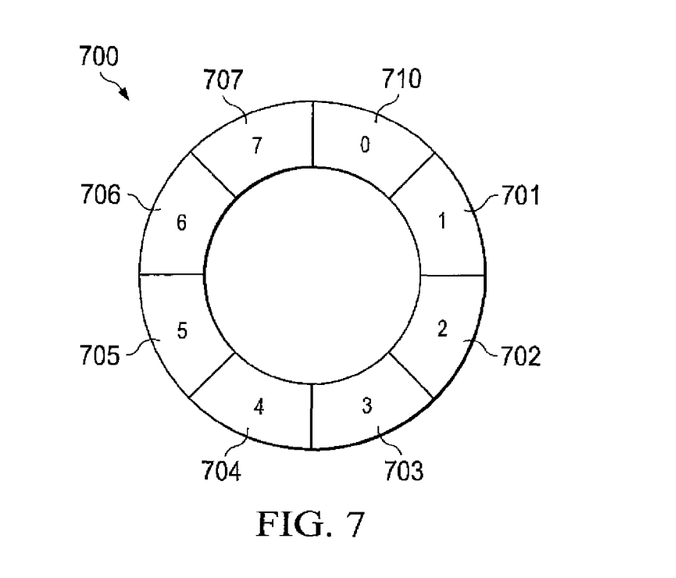
FIG. 7 illustrates a circular transmission of a UM transmitter according to embodiments of the present disclosure.

FIG. 7 illustrates a circular transmission of a UM transmitter according to embodiments of the present disclosure. The embodiment shown in FIG. 7 is for illustration only. The circular transmission 700 shown in FIG. 7 is an n=3 transmission. Other embodiments, and transmission with different SN bit values (e.g., different values for n), could be used without departing from the scope of this disclosure.

The circular transmission 700 includes a number of slots for eight bits (e.g., n=3 wherein $2^n$=# of bits). For clarity in description and illustration by example, the slots are labeled from '0' 710, '1' 701, '2' 702, '3' 703, '4' 704, '5' 705, '6' 706 and '7' 707.

In some embodiments the UM receiver 420 does not make a slot with SN of k available to receive a new UMD PDU unless a time has passed such that no more retransmissions of the previous UMD PDU with SN of k is possible. For example, the UM receiver 420 is configured such that a new UMD PDU cannot be received into an SN of, for example, "2" unless a time has passed such that no more retransmissions of the previous UMD PDU with an SN of "2" is possible.

In some embodiments, the UM receiver 420 uses a receiving window such that once a slot with SN of k is included in the receiving window, the slot shall be kept inside the receiving window until the time for all the possible re-transmissions of the UMD PDU with SN of k have passed. For example, VR(UX) 550 could be maintained inside of the receiving window until the Timer T_reordering expires.

In some embodiments, the UM receiver 420 uses an oversized receiving window. The oversized receiving window includes enough slots to accommodate all possible retransmissions while not halting the flow of new UMD PDUs. Given an n-bit SN, the size of the oversized receiving window could be as large as $2^n-1$. For example, if the UM_Window_Size is defined as $2^n-1$, the window size is sufficient to support an Acknowledged Mode (AM).

In some embodiments, the UM transmitter 415 does not mix the transmission of new series of UMD PDUs with the retransmission of the previous series of UMD PDUs that have overlapped SNs. For example, the UM transmitter 415 can utilize the circular transmission scheme 700 illustrated in FIG. 7. If the SN is of n-bit, such as n=3, the UM transmitter 415 can deliver to the lower HARQ layer up to $2^n$ UMD PDUs, such as with SN 0, 1, . . . , $2^n-1$. Having delivered the $2^n$ UMD PDUs, however, if the UM transmitter 415 is aware that the retransmission of the UMD PDU with SN of '0' is still occurring, the UM transmitter 415 does not deliver any more UMD PDUs to the HARQ layer, such as to the HARQ transmitter 425. More generally, if UM transmitter 415 is aware that the retransmission of the UMD PDU with SN of k is still occurring, the UM transmitter 415 does not deliver, to the HARQ transmitter 425, a UMD PDU with SN equal to or larger than k more than once.

In some embodiments, the UM transmitter 415 RLC maintains the state variables VT(US) and VT(UA). VT(US) is a state variable that holds the value of the SN to be assigned for the next newly generated UMD PDU. VT(US) is initially set to '0.' VT(US) is updated whenever the UM RLC entity delivers a UMD PDU with SN=VT(US). VT(UA) is a state variable that holds the value of the smallest SN that has been clean of retransmission. VT(UA) is initially set to '0.' VT(UA) is updated whenever a report has been received from the HARQ entity about the completion of the transmission and any retransmissions.

Additionally, the UM receiver 420 RLC maintains the state variables VR(UR); VR(UX); VR(UH); and VR(UC). VR(UR) is a UM receive state variable that holds the value of the SN of the earliest UMD PDU that is still considered for reordering. VR(UR) is initially set to '0.' VR(UX) is a UM T_reordering state variable that holds the value of the SN following the SN of the UMD PDU that triggered T_reordering. VR(UX) is initially set to NULL. VR(UH) is a UM highest received state variable that holds the value of the SN following the SN of the UMD PDU with the highest SN among received UMD PDUs. VR(UH) serves as the higher edge of the reordering window. It is initially set to '0.' VR(UC) is a variable corresponding to a UM highest SN clean of HARQ reordering. VR(UC) is a state variable that holds the value of the SN following the SN of the UMD PDU with the highest SN among received UMD PDUs that are clean of HARQ reordering.

A constant also is used by the UM receiver 420 RLC to define SNs of those UMD PDUs that can be received without causing an advancement of the receiving window. For example, a UM_Window_Size=31 when a five (5) bit SN is configured and a UM_Window_Size=1023 when a ten (10) bit SN is configured.

The UM receiver 420 RLC also uses the timer, T_reordering, in order to detect loss of RLC PDUs at lower layer. The maximum value of T_ordering is smaller than the smallest time that it takes for any UMD PDU to cross the receiving window. For example, the maximum value of T_ordering is smaller than the smallest time it takes for a UMD PDU to enter the receiving window and to the leave the receiving window. The slot of SN k in the receiving window is not removed from the receiving window until the time for all possible retransmissions of the UMD PDU with the SN k have passed. If T_reordering is running, T_reordering is not started again, that is, only one T_reordering per RLC entity is running at a given time.

An example of the UM data transfers is as follows:

For transmit operations, when receiving a new UMD SDU from the higher layer, if VT(US)=VT(UA), the UM transmitter 415 does not deliver any UMD PDUs until VT(US)≠VT(UA). Alternatively, the UM transmitter 415 delivers a new UMD PDU to the lower layer, such as to HARQ transmitter 425, sets the SN of the UMD PDU to VT(US), and increments VT(US) by one. The UM transmitter 415 also marks VT(US)−1 as not clean of a retransmission.

The UM transmitter 415 can receive a report from the HARQ transmitter 425 (e.g., lower layer) that no retransmissions occurred. When receiving a report from the HARQ transmitter 425 marked as clean of the retransmission of a UMD PDU with SN of x, the UM transmitter 415, if VT(UA)=x, sets VT(UA) to the next SN that is larger than the current VT(UA) but has not been cleaned of retransmission. If VT(UA)=VT(US), then the UM transmitter 415 sets VT(UA)=Null. Alternatively, the UM transmitter 415 marks the SN of x as clean of the retransmission.

For receive operations, the UM receiver 420 RLC maintains a reordering window according to the state variable VR(UH) such that, a SN falls within the reordering window if VR(UC)≦SN<VR(UH); otherwise, the SN falls outside of the reordering window. When receiving an UMD PDU from lower layer (i.e., the HARQ receiver 430), the UM receiver 420 RLC either discards the received UMD PDU or places the received UMD PDU in a reception buffer. If the received UMD PDU was placed in the reception buffer, the UM receiver 420 updates the state variables, reassembles and delivers RLC SDUs to the upper layer and starts/stops T_reordering as needed. When T_reordering expires, the UM receiver 420 RLC updates state variables, reassembles and delivers RLC SDUs to upper layer and starts T_reordering as needed.

When an UMD PDU with SN=x is received from the HARQ receiver 430 (i.e., lower layer), the receiving UM RLC discards the received UMD PDU if any of the following occurs: x>VR(UC)+UM_Window_Size; VR(UR)≦x<VR(UH) and the UMD PDU with SN=x has been received before; or VR(UC)≦x<VR(UR). Alternatively, the UM receiver 420 places the received UMD PDU in the reception buffer.

When a UMD PDU with SN=x is placed in the reception buffer, the UM receiver 420 RLC, if x falls outside of the reordering window, updates VR(UH) to x+1. The UM receiver 420 also reassembles RLC SDUs from any UMD PDUs with an SN that falls outside of the reordering window and removes RLC headers when doing so. The UM receiver 420 also delivers the reassembled RLC SDUs to upper layer in ascending order of the RLC SN if not delivered before. If VR(UR) also falls outside of the reordering window, the UM receiver 420 sets VR(UR) to the first UMD PDU that has not been received following the UMD PDU with SN of (VR(UH)−UM_Window_Size). However, if the reception buffer contains a UMD PDU with SN=VR(UR), the UM receiver 420 updates VR(UR) to the SN of the first UMD PDU with SN>current VR(UR) that has not been received; reassembles RLC SDUs from any UMD PDUs with SN<updated VR(UR), removes RLC headers when doing so, and delivers the reassembled RLC SDUs to upper layer in ascending order of the RLC SN if not delivered before.

If T_reordering is not running (includes the case when T_reordering is stopped due to actions above) and if VR(UH)>VR(UR), the UM receiver 420 starts T_reordering and sets VR(UX) to VR(UH). When T_reordering expires, the UM receiver 420 RLC sets VR(UC) to VR(UX); updates VR(UR) to the SN of the first UMD PDU with SN≧VR(UX) that has not been received; reassembles RLC SDUs from any UMD PDUs with SN<updated VR(UR), removes RLC headers when doing so, and delivers the reassembled RLC SDUs to upper layer in ascending order of the RLC SN if not delivered before. If VR(UH)>VR(UR), the UM receiver 420 starts T_reordering and sets VR(UX) to VR(UH). Alternatively, the UM receiver 420 sets VR(UX) to NULL.

Thereafter, VR(UC) is updated for all UMD PDUs. Each slot in the receiving window includes its own T_reordering timer besides the T_reordering timer associated with VT(UX). When a UMD PDU with SN of x is put in the receiver window, VT(UX)≧x starts the timer for this slot. When the timer of UMD PDU of k expires, VT(UC)<k sets VT(UC) to k.

Embodiments of the present disclosure also provide a method for deciding an optimized UM Window size. The UM_Window_Size can be decided based on one or more of the robustness requirement, the reliability of HARQ, and the channel model that tells the joint probability of losing m packet in a row.

The HARQ packet error rate is about $10^{-3}$, which implies that a loss rate for m independent packets would be $10^{-3m}$. Therefore, the UM_Window_Size is decided based on one of the robustness requirement, the reliability of HARQ, and the channel model that tells the joint probability of losing m packet in a row. For example, if it is demonstrated that the joint probability of losing four packets in a row is $10^{-7}$, then the UM_Window_Size is set to be '28' (i.e., 32−4) for five-bit SN, and '1020' (i.e., 1024−4) for ten-bit SN respectively if $10^{-7}$ satisfies the requirement for overall UM robustness. This almost doubles the UM_Window_Size as compared to other systems.

The UM_Window_Size as specified in conventional systems is half of the number of allowable SNs (e.g., '16' for five-bit SN, and '512' for ten-bit SN). This window size is sufficient for supporting ARQ (i.e., AM in LTE) to deal with the loss of acknowledgement message when the receiver advances the receiving window whereas the transmitter dwells on the original transmitting window. In that case, to use a window size that includes half of the number of allowable SNs enables the receiver to not take a duplicated packet as a new one. For example, when an AM transmitter sends PDUs with SNs of '0,' '1' '15,' which are successfully received by the AM receiver which then advances the receiving window to '16,' '17,' '31' after sending an acknowledgement message. Even if the feedback message is lost, the retransmission from the transmitter will not cause the receiver to receive a duplicated PDU because now the two windows are completely non-overlapped.

However, the same analysis does not apply for UM operation. The lack of layer-2 feedback actually creates more challenges towards determining an appropriate UM_Window_Size. The UM scheme in 3GPP TS 36.322 V8.5.0 (2009-03), $3^{rd}$ Generation Partnership Project; Technical Specification Group Radio Access Network; Evolved Universal Terrestrial Radio Access (E-UTRA); Radio Link Control protocol specification (Release 8), the contents of which are hereby incorporated by reference in their entirety, does not include a flow control in the transmitter side. The higher edge of the UM receiving window is driven by the highest SN received. The UM scheme in 3GPP TS 36.322 V8.5.0 (2009-03) could fail in many scenarios no matter what UM_Window_Size is used.

In some embodiments of the present disclosure, flow control is utilized on the transmitter side with optimal determination of UM_Window_Size. Using a window size half of the number of allowable SNs does not guarantee that the UM receiver 420 will not receive a duplicated packet as a new one, or will not discard legitimate packets. For example, the UM transmitter 415 sends packets with SNs of '0,' '1,' '15,' among which, at least the packet with an SN of '0' never reaches the UM receiver 420. Furthermore, the UM transmitter 415 continues sending packets with SNs of '16,' '17,' '31.' If these packets are lost, the UM receiver 420 is not informed that the UM transmitter 415 has already advanced the transmitting window.

Figure 8:
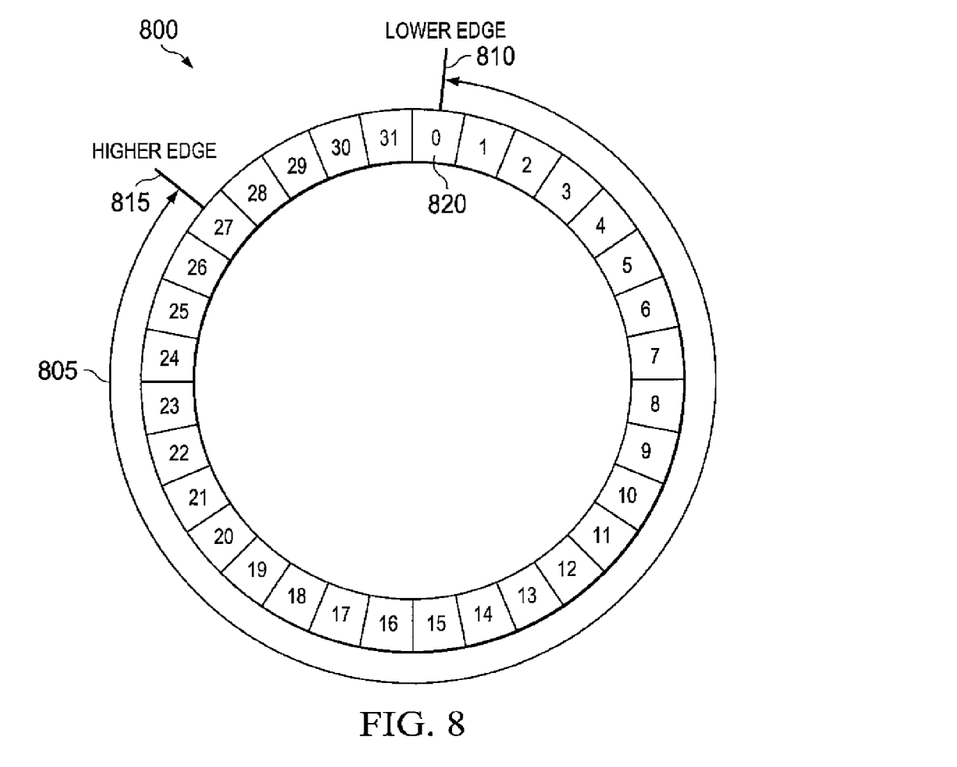
FIG. 8 illustrates another circular transmission of a UM transmitter according to embodiments of the present disclosure.

FIG. 8 illustrates another circular transmission of a UM transmitter according to embodiments of the present disclosure. The embodiment of the circular transmission 800 shown in FIG. 8 is for illustration only. The circular transmission 800 shown in FIG. 8 is an n=5 transmission. Other embodiments, and transmission with different SN bit values (e.g., different values for n), could be used without departing from the scope of this disclosure.

The circular transmission 800 includes thirty-two bits (e.g., n=5 wherein $2^n=\#$ of bits). For clarity in description and illustration by example, the bits are labeled from '0' to '31'. The circular transmission 800 includes a transmission window 805 defined by a lower edge 810 and an upper edge 815. In one example, the transmission window 805 is twenty-eight bits as defined by UM_Window_Size.

In some embodiments, the UM transmitter 415 is capable of performing a method of UM Transmitter Flow Control. Flow control by the UM transmitter 415 enables the establishment of a rigorous UM (i.e., non-ARQ) protocol. The UM transmitter 415 does mix the transmission of new UMD PDUs with the retransmission of the previous ones if they have overlapped SNs. The UM transmitter 415 determines if a retransmission of a UMD PDU is occurring. If the retransmission is occurring, the UM transmitter 415 further determines if the retransmitted UMD PDU includes an SN that overlaps a new UMD PDU.

For example, if the SN is an n-bit (e.g., n=5), the UM transmitter 415 can deliver to the HARQ transmitter 425 up to '28' UMD PDUs, as defined by the transmission window 805. The transmission window 805 includes SNs of '0,' '1,' '27.' After the UM transmitter 415 has delivered the twenty eight UMD PDUs, the UM transmitter 415 determines that a retransmission of SN '0' 820 is occurring. Therefore, the UM transmitter 415 does not deliver any new UMD PDUs to the HARQ transmitter 425.

Figure 9:
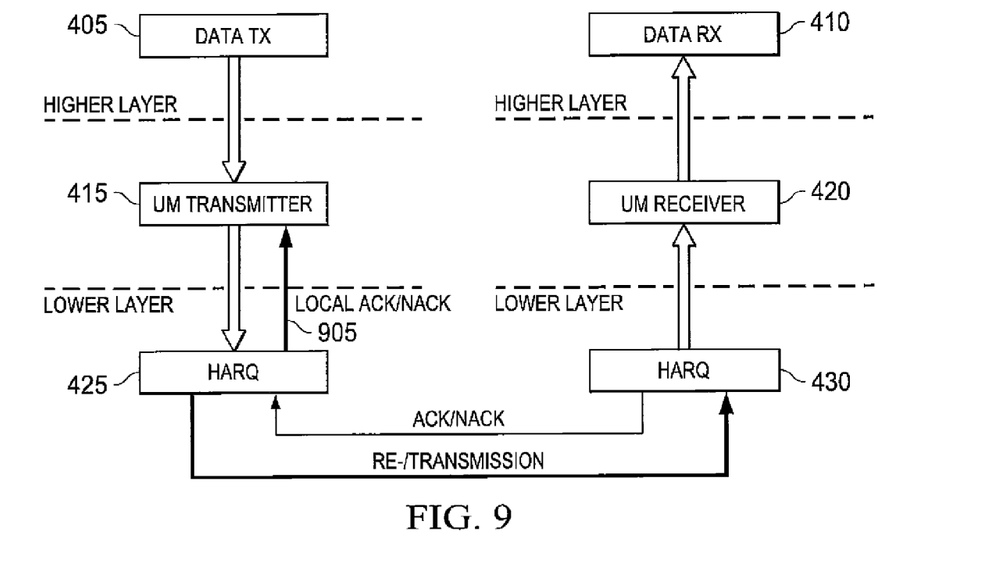
FIG. 9 illustrates another model of UM and HARQ entities according to embodiments of the disclosure.

FIG. 9 illustrates a model of UM and HARQ entities according to embodiments of the disclosure. A data transmitter 405 and data Receiver 410 are each included in a layer above the UM transmitter 415 and UM receiver 420. A HARQ transmitter 425 and HARQ receiver 425 are included in the lower layer below the UM transmitter 415 and UM receiver 420.

In some embodiments, the UM transmitter 415 is operable to perform a method to know which UMD PDU has been transferred to the UM receiver 420. The UM transmitter 415 can know which UMD PDU has been transferred to the UM receiver 420 even though a layer-2 feedback, as used by an AM protocol, may not exist. The UM transmitter 415 can obtain the PDU delivery status based on the interaction with the HARQ transmitter 425. Since a layer-1 feedback exists between HARQ entities, such as HARQ transmitter 425 and HARQ receiver 430. The HARQ transmitter 425 can relay the layer-1 ACK to the UM transmitter 415. The relaying of the Layer-1 ACK can referred to as a local ACK and is transmitted via local ACK/NACK 905.

Alternatively, when the maximum number of retransmissions 910 have been exhausted for a UMD PDU and no ACK has been received, the HARQ transmitter 425 can send a NACK to the UM transmitter 415. The NACK sent from the HARQ transmitter 425 to the UM transmitter 415 can referred to as a local NACK via and is transmitted local ACK/NACK 905. Only after receiving a local NACK or local ACK (e.g., local ACK/NACK 905) for a PDU with SN of k, does the UM transmitter 415 make SN of k available for a new PDU.

Accordingly, the flow control in the UM transmitter 415 is established using an UM_Window_Size of $2^{n-m}$ for n-bit SN. Additionally, the UM transmitter 415 is operable to restrain from sending new packet with SNs outside of the transmitting window whose lower edge is driven based on the local ACK/NACK information.

In some embodiments, the UM receiver 420 is operable to perform a method to reorder HARQ packets. The flow control in the UM transmitter 415 and the optimally defined UM_Window_Size not only enables the robustness of the UM operation, but also dramatically simplifies the receiver operation. The UM receiver 420 maintains the HARQ reordering window (a.k.a., the UM receiving window), whose higher edge (and thus, the entire window) is driven by the highest SN received. Unlike conventional systems where UM receiver maintains three state variables and the T-reordering timer, the UM receiver 420 according to this disclosure includes only one state variable VR(UH), which is the higher edge of the HARQ reordering window. The UM receiver 420, as such, simply operates as follows:

When a UMD PDU with SN=x is received, if (VR(UH)− UM_Window_Size)≦x<VR(UH), and if a UMD PDU with SN=x is already in the reordering window, the UM receiver

420 discards the duplicated packets. Alternatively, if (VR (UH)−UM_Window_Size)≦x<VR(UH), but a UMD PDU with SN=x is not already in the reordering window, the UM receiver 420 stores the UMD PDU in the reordering window. Otherwise, the UM receiver 420 sets VR(UH)=x and stores the UMD PDU in the reordering window, assembles all the UMD PDUs outside of the reordering window and delivers the UMD PDUs to the higher layer.

Although the present disclosure has been described with an exemplary embodiment, various changes and modifications may be suggested to one skilled in the art. It is intended that the present disclosure encompass such changes and modifications as fall within the scope of the appended claims.

What is claimed is:

1. For use in a wireless network capable of communicating with a plurality of mobile stations, a terminal capable of preventing a miss detection of duplicated unacknowledged mode data (UMD) protocol data units (PDU) and an out-of-sequence delivery in unacknowledged mode (UM) operations, the terminal comprising:
a receiver configured to not make a slot with a sequence number (SN) of k available to receive a new UMD PDU unless a time has passed such that no more retransmissions of a previous UMD PDU with the SN of k is possible.

2. The terminal set forth in claim 1, wherein the receiver further is configured to maintain the slot with the SN of k within a receiving window until the time has passed such that no more retransmissions of a previous UMD PDU with the SN of k is possible.

3. The terminal as set forth in claim 1, wherein the receiver is configured to utilize a receiving window configured to accommodate a number of retransmissions, wherein the receiving window includes a size proportional to a number of bits of the SN of k.

4. The terminal as set forth in claim 1, wherein the receiver is configured to receive a new series of UMD PDUs in a transmission that is separate from a transmission containing a retransmission of a previous series of UMD PDUs if at least one UMD PDU in the previous series of UMD PDUs overlaps with at least one UMD PDU in the new series of UMD PDUs.

5. The terminal as set forth in claim 1, further comprising a transmitter configured to determine a transmission window size for transmitting UMD PDUs.

6. The terminal as set forth in claim 5, wherein the transmission window size is determined based on at least one of a robustness requirement, a reliability of a Hybrid Automatic Repeat Request (HARQ), and a channel model configured to report a joint probability of losing m number of packets in a row.

7. The terminal as set forth in claim 5, wherein the transmitter is configured to control a flow of UMD PDUs such that a new series of UMD PDUs is not mixed with a retransmission of a previous series of UMD PDUs.

8. The terminal as set forth in claim 5, wherein the transmitter comprises a lower layer and an upper layer, the lower layer comprising a HARQ transmitter configured to send a local Acknowledgement (ACK)/Negative Acknowledgment (NACK) to the upper layer.

9. For use in a wireless network capable of communicating with a plurality of mobile stations, a method for preventing a miss detection of duplicated unacknowledged mode data (UMD) protocol data units (PDU) and an out-of-sequence delivery in unacknowledged mode (UM) operations, the method comprising:
making available a slot with a sequence number (SN) of k to receive a new UMD PDU after a time has passed such that no more retransmissions of the previous UMD PDU with the SN of k is possible.

10. The method set forth in claim 9, further comprising maintaining the slot with the SN of k within a receiving window until the time has passed such that no more retransmissions of a previous UMD PDU with the SN of k is possible.

11. The method as set forth in claim 9, further comprising utilizing a receiving window configured to accommodate a number of retransmissions, wherein the receiving window includes a size proportional to a number of bits of the SN of k.

12. The method as set forth in claim 9, further comprising receiving a new series of UMD PDUs in a transmission that is separate from a transmission containing a retransmission of a previous series of UMD PDUs if at least one UMD PDU in the previous series of UMD PDUs overlaps with at least one UMD PDU in the new series of UMD PDUs.

13. The method as set forth in claim 9, further comprising determining a transmission window size for transmitting UMD PDUs.

14. The method as set forth in claim 13, wherein the transmission window size is determined based on at least one of a robustness requirement, a reliability of a Hybrid Automatic Repeat Request (HARQ), and a channel model configured to report a joint probability of losing m number of packets in a row.

15. The method as set forth in claim 13, further comprising controlling a flow of UMD PDUs such that a new series of UMD PDUs is not mixed with a retransmission of a previous series of UMD PDUs.

16. The method as set forth in claim 13, sending a local Acknowledgement (ACK)/Negative Acknowledgment (HACK) from a lower layer included in a transmitter to an upper layer included in the transmitter.

17. For use in a wireless network capable of communicating with a plurality of mobile stations, a system capable of preventing a miss detection of duplicated unacknowledged mode data (UMD) protocol data units (PDU) and an out-of-sequence delivery in unacknowledged mode (UM) operations, the system comprising:
a receiver configured to not make a slot with a sequence number (SN) of k available to receive a new UMD PDU unless a time has passed such that no more retransmissions of a previous UMD PDU with the SN of k is possible; and
a transmitter configured to determine a transmission window size for transmitting UMD PDUs.

18. The system set forth in claim 17, wherein the receiver further is configured to maintain the slot with the SN of k within a receiving window until the time has passed such that no more retransmissions of a previous UMD PDU with the SN of k is possible.

19. The system as set forth in claim 17, wherein the receiver is configured to utilize a receiving window configured to accommodate a number of retransmissions, wherein the receiving window includes a size proportional to a number of bits of the SN of k.

20. The system as set forth in claim 17, wherein the receiver is configured to receive a new series of UMD PDUs in a transmission that is separate from a transmission containing a retransmission of a previous series UMD PDUs if at least one UMD PDU in the previous series of UMD PDUs overlaps with at least one UMD PDU in the new series of UMD PDUs.

21. The system as set forth in claim 17, wherein the transmission window size is determined based on at least one of a robustness requirement, a reliability of a Hybrid Automatic Repeat Request (HARQ), and a channel model configured to report a joint probability of losing m number of packets in a row.

22. The system as set forth in claim 17, wherein the transmitter is configured to control a flow of UMD PDUs such that a new series of UMD PDUs is not mixed with a retransmission of a previous series of UMD PDUs.

23. The system as set forth in claim 17, wherein the transmitter comprises a lower layer and an upper layer, the lower layer comprising a HARQ transmitter configured to send a local Acknowledgement (ACK)/Negative Acknowledgment (NACK) to the upper layer.

* * * * *